United States Patent [19] [11] 4,231,093
LaVance et al. [45] Oct. 28, 1980

[54] METHOD OF RETURNING TO A LAST POINT IN A PATH AFTER A TEMPORARY DISCONTINUANCE OF AN OPERATION

[75] Inventors: Cecil N. LaVance, Paradise Valley; Allan A. Beale, Scottsdale, both of Ariz.

[73] Assignee: Motorola, Inc., Schaumburg, Ill.

[21] Appl. No.: 940,914

[22] Filed: Sep. 11, 1978

[51] Int. Cl.³ .................... G06F 15/50; G01S 5/14; G01S 13/08
[52] U.S. Cl. .................... 364/460; 244/136; 343/6.5 LC; 364/449; 364/443
[58] Field of Search ............ 364/443, 449, 460; 343/6.5 R, 6.5 LC, 107, 108, 112 R, 112 TC; 244/136, 175

[56] References Cited

U.S. PATENT DOCUMENTS

| | | | |
|---|---|---|---|
| 2,599,889 | 6/1952 | Biggs et al. | 364/449 |
| 2,932,023 | 4/1960 | Haskins | 343/107 |
| 2,941,753 | 6/1960 | Ripper | 343/108 |
| 3,104,390 | 9/1963 | Preuss | 343/107 |
| 3,150,372 | 9/1964 | Groth, Jr. | 364/452 |
| 3,659,085 | 4/1972 | Potter et al. | 364/449 |
| 3,810,179 | 5/1974 | Merrick | 343/6.5 LC |
| 3,821,523 | 6/1974 | Chisholm et al. | 364/460 |
| 3,864,662 | 2/1975 | David et al. | 343/6.5 R |
| 3,922,533 | 11/1975 | Royal | 343/112 R |
| 3,959,793 | 5/1976 | Litchford | 343/6.5 LC |
| 3,979,057 | 9/1976 | Katz et al. | 364/443 |
| 4,128,835 | 2/1978 | Russell | 343/6.5 LC |

*Primary Examiner*—Felix D. Gruber
*Attorney, Agent, or Firm*—Eugene A. Parsons

[57] ABSTRACT

In conjunction with an operation of flying a plurality of parallel paths in a predetermined pattern utilizing an electronic positioning apparatus including a radar for periodically measuring the distance of the apparatus from each of two spaced apart reference stations and for continuously computing the distance of the apparatus along any of the parallel paths, a method of returning to a last point in a path of the pattern after temporary discontinuance of the operation including resetting an original reference coordinate system so that the zero point thereof coincides with the last point and providing a distance indicator which indicates distance along an axis of the coordinate system so that the pilot can use the indicator to fly the airplane back to zero in the coordinate system.

2 Claims, 4 Drawing Figures

METHOD OF RETURNING TO A LAST POINT IN A PATH AFTER A TEMPORARY DISCONTINUANCE OF AN OPERATION

BACKGROUND OF THE INVENTION

In general, radar tri-lateralization position locators are utilized in navigation and the like to determine the position of ships relative to two or more fixed shore stations. The baseline or distance between the two stations must always be included in the position calculations. In these types of prior art devices the shore stations are never moved and, may include, a relatively large number of stations positioned along a shore or navigation course so that a ship may use signals from different stations along its course to determine its position. Only two stations are used in each calculation and, since the stations are permanently positioned at known locations, the distance between these stations is always known and can be readily included into the computations.

When a radar electronic positioning system is utilized for guiding airplanes, for example, in crop dusting, spraying forests, or in any other application where a uniform flight pattern is required, reference stations must be set up for each operation and the distance between the reference stations (the baseline) must be included. If the operation includes a large area the operator may have to frequently reload the airplane with spray and fuel. When the reloading is required the operator must leave the pattern. When the reloading is completed it is desirable to return to the exact point at which the operation was interrupted and continue the operation. Overlaps are costly because of the extra spray used and can sometimes be detrimental to the health of plants because of the excess spray. Missed areas can be detrimental to the operation because it leaves insects and/or diseases uncontrolled. In all prior art systems known to us the operator must guess at the correct point or he must fly until all of the indicators read the same as they did when he left the pattern. This is generally very difficult. Further, all of the known prior art systems utilize extremely complex apparatus which is very costly and requires much of the pilots time for setting up the operation and operating during the spraying or the actual flight.

SUMMARY OF THE INVENTION

The present invention pertains to a method of returning to a last point in a path of an operation after a temporary discontinuance of the operation wherein electronic positioning apparatus is utilized to define a coordinate system and indicators provide a continuous indication of the position of the apparatus within the coordinate system. When the operator reaches a point at which he wishes to temporarily discontinue the operation he pushes a button which shifts the coordinate system so that the zero point thereof is at the position at which the button was pushed. When the operator wishes to return to this point and reinitiate the operation the indicators will quickly lead him directly to the point.

It is an object of the present invention to provide a new and improved method of returning to a last point in a path after temporary discontinuance of an operation.

It is a further object of the present invention to provide a method of returning to a last point in a path by shifting a coordinate system defined and indicated by an electronic positioning system so that the zero point thereof coincides with the last point.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
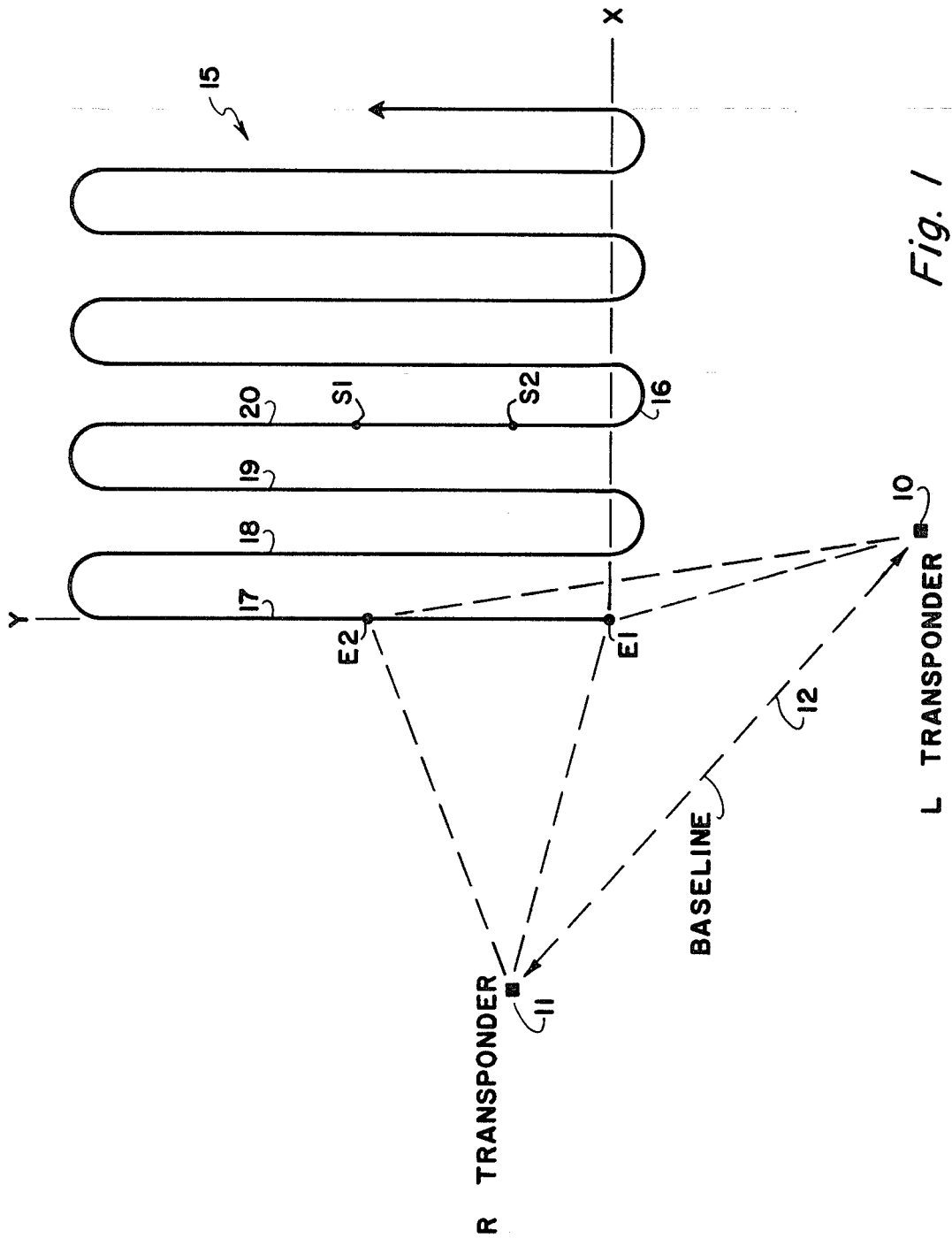
FIG. 1 is a plan view of a typical operation.

Referring specifically to FIG. 1, a plan view of a typical operation for crop dusting, forest spraying or the like is ilustrated. A first or left transponder, as viewed front the area to be sprayed, is designated with the number 10. A second transponder, spaced from the transponder 10 by any convenient distance, is designated 11. The straight line between the transponders 10 and 11 is referred to as a base-line and is designated 12. The area to be dusted, etcetera, is generally designated 15 and a typical pattern 16, to be flown over the area, is illustrated in part. The pattern 16 consists of a plurality of parallel paths 17, 18, 19, 20, etc. The transponders 10 and 11 may be set up at any convenient location generally within the line of sight of the area 15.

Figure 2:
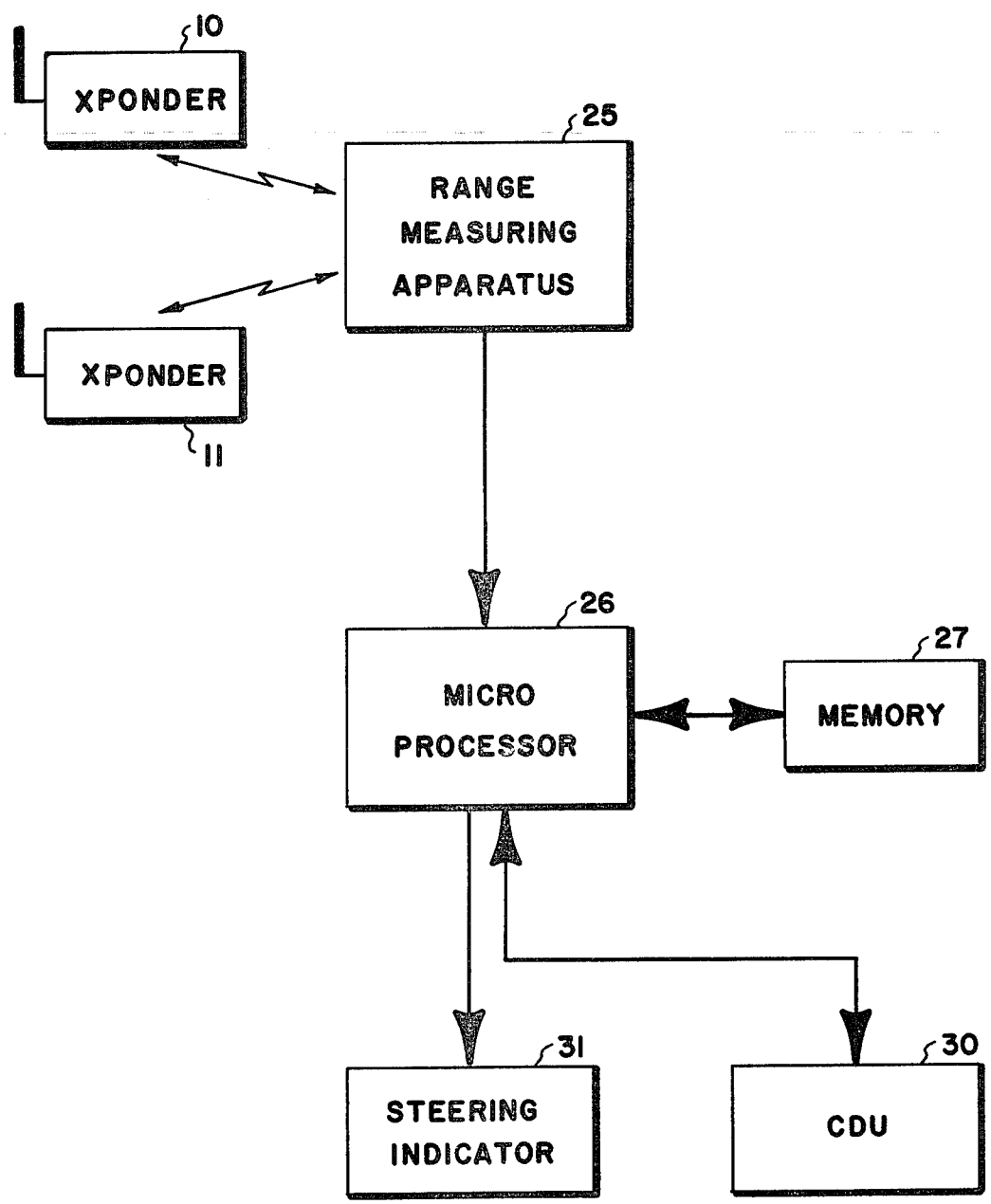
FIG. 2 is a simplified block diagram of electronic positioning apparatus.

Referring specifically to FIG. 2, a block diagram of typical electronic positioning apparatus is illustrated. The transponders 10 and 11 are associated with range measuring apparatus 25 which includes some type of radar operating at the frequence of the transponders 10 and 11 and which is capable of substantially continuously measuring the distance from the apparatus 25 to each of the transponders 10 and 11. The transponders 10 and 11 each transmit and receive with a unique identification code so that the range measuring apparatus 25 can differentiate between each of the transponders 10 and 11. In general, the radar of the apparatus 25 may be a continuous wave or pulsed radar and determines the range by measuring the time required for a signal to travel to the transponders 10 and 11 and for a signal to return from the transponders 10 and 11, in the well-known manner. It should be understood that the transponders 10 and 11 could be active or passive and it is only necessary that they operate in conjunction with the range measuring apparatus 25 to obtain range data throughout the area 15.

Figure 4:
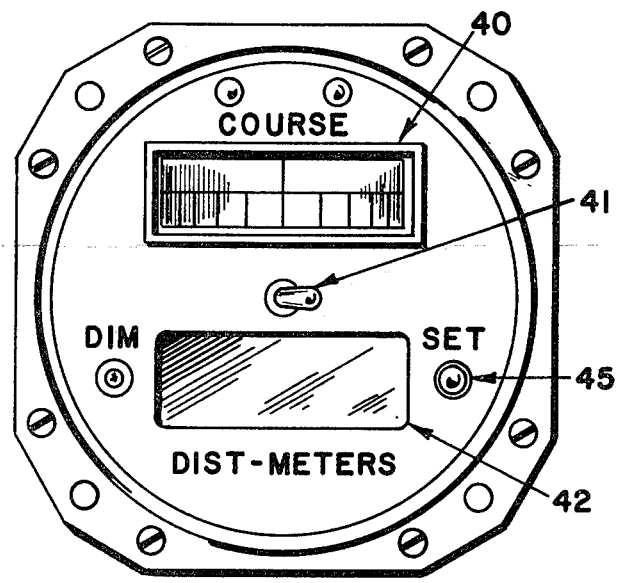
FIG. 4 is a plan view of the front panel of a steering indicator unit.
Figure 3:
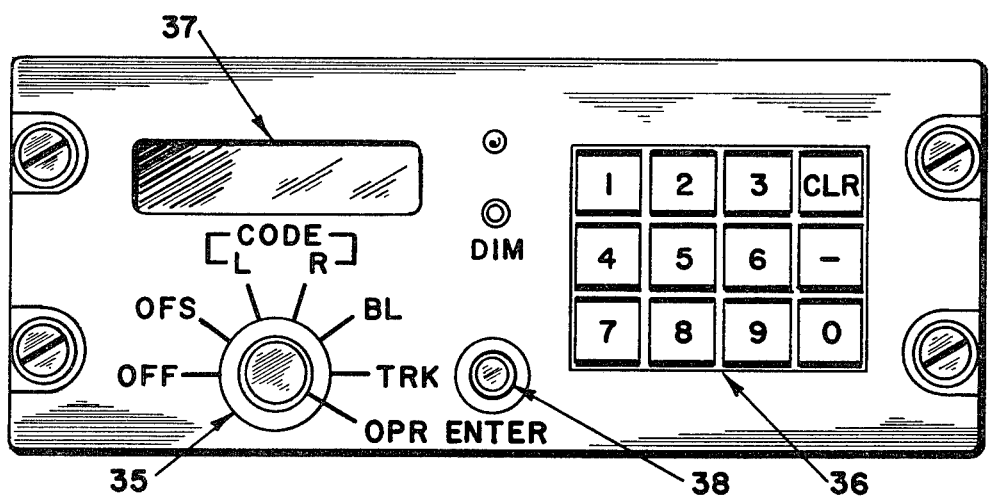
FIG. 3 is a plan view of a front panel for a control unit.

The range measuring apparatus 25 supplies range information to a microprocessor 26 which has a memory 27 associated therewith in a manner well-known to those skilled in the art. The microprocessor 26 also receives information from a control display unit (CDU) 30 and supplies information thereto. The front panel of the control display unit is illustrated in FIG. 3. Also, the microprocessor 26 supplies information to a steering indicator 31, the front panel of which is illustrated in FIG. 4. The microprocessor 26 and memory 27 are connected and programmed in a well-known manner to receive information from apparatus 25 and control/display unit 30 and to process this informa- tion and provide continuous steering indications to the indicator 31.

Because these computations utilize standard arithmetic logic to solve well-known formulas and because the program may be set up in a variety of ways, a specific program will not be disclosed herein.

In the set up of a typical operation, such as that shown in plan view in FIG. 1, initial information required for the operation is entered into portions of the memory 27 through the microprocessor 26, in the usual fashion, by operating the control display unit 30 in the following manner. Referring to FIG. 3, a multiposition switch 35 is located on the front panel of the CDU and is initially operated by rotating the switch in a clockwise direction from an off position to a first offset position labeled OFS. With the multiposition switch 35 in the offset position the amount of spacing between parallel paths 17, 18, etc. is selected by operating comparable keys on a keyboard 36 also located on the front panel of the CDU. As the keys of the keyboard 36 are operated the selected offset distance appears in a display window 37. If the offset appearing in display window 37 corresponds with the desired offset, an "enter" button 38 can be depressed to enter the information into the memory 27.

The multiposition switch 35 is then rotated clockwise to the second position, designated L, which allows a specific unique identification code for the left transponder 10 to be entered into the memory 27 through the microprocessor 26. Each of the transponders 10 and 11 are preset internally with a unique identifying code so that the range measuring apparatus 25 can differentiate between the two. This unique identifying code must be entered into the memory 27 and used by the microprocessor 26 to differentiate between signals received so that the apparatus 25 "knows" which transponder 10 or 11 it is communicating with. With the switch 35 in position L the keyboard 36 is operated to select the code previously entered into the transponder 10 and this code appears in the display window 37. With the correct code illustrated in display window 37, the "enter" button 38 is depressed to enter the information into the memory 27. In a similar fashion the switch 35 is moved to the next position, designated R, and the code for the right transponder 11 is entered into the memory 27.

The next position of the switch 35 is designated BL and is used to enter information into the memory 27 as to the length of the baseline 12. Information as to the length of the baseline 12 can be entered into the memory 27 in two different ways. If the length of the baseline 12 is known, this information can be entered by way of the keyboard 36 and the enter switch 38. If the transponders 10 and 11 are situated so that the baseline 12 cannot be easily measured, for example on the crests of spaced apart hills, the length of the baseline 12 can be entered into the memory 27 as follows. As is normal when using a keyboard like the keyboard 36 in conjunction with a computer, a "clear" button, designated CLR, is provided and this button should be depressed first before selecting desired information, to clear the apparatus of previously selected information. In the present situation, with the switch 35 in the baseline position, the "clear" button is depressed and the pilot flies the plane so that it and the apparatus 25 are situated directly over one of the transponders 10 or 11. In this position the apparatus 25 is only supplying information to the microprocessor 26 as to the length of the baseline 12 because the distance to the transponder over which the plane and apparatus 25 are situated is substantially zero relative to the length of the baseline 12. With the apparatus 25 situated directly over one of the transponders 10 or 11, the operator depresses the "enter" button 38 so that the measured length of the baseline 12 is supplied from the apparatus 25 through the microprocessor 26 into the memory 27. Utilizing this method, baselines which would be extremely difficult and time consuming to measure can be quickly and easily introduced into the memory 27 without appreciable loss of time. Further, because this method is available to the person setting up an operation, the position of the transponders 10 and 11 is not as critical as it would be if an exact measurement therebetween were required in advance. Thus, additional time can be saved in setting up an operation because the transponders 10 and 11 can be positioned at literally any convenient position within the line of sight of the area 15.

The next position of the switch 35 is designated TRK and is used to enter information into the memory 27 as to the direction of the flight paths 17, 18, etc. With the switch 35 in the track position the pilot flies the airplane along the first path 17 and depresses the "enter" button as he passes over the point labeled E1 in FIG. 1. He continues to fly along the path 17 and again depresses the "enter" button 38 as he passes over the point E2, which is spaced from the point E1. In the operation illustrated in FIG. 1, the point E1 is at the beginning of the path 17, for convenience, but it should be understood that it is only necessary that the points E1 and E2 be spaced apart along the path 17 to correctly enter the direction information into the memory 27. The points E1 and E2 essentially define the Y axis in an XY coordinate system (see FIG. 1) and the point E1 defines the X axis. By locating the point E1 at the beginning of the path 17 the X axis passes through the beginning of the path and defines the beginning of each of the remaining paths 18, 19, 20, etc. A course meter 40 on the steering indicator 31 continually indicates to the pilot his deviation from a flight path parallel to the Y axis of the XY coordinate system. Direction of the meter movement 40 may be reversed by a switch 41 each time there is a reversal in flight direction due to a change in flight paths, for example when the plane moves from flight path 17 to flight path 18. A distance indicator 42 is also supplied on the steering indicator 31 and continually supplies information as to the distance of the airplane from the X axis of the XY coordinate system. As can be seen in FIG. 1, and will be understood by those skilled in the art, the apparatus measures the distance of the vehicle carrying the apparatus 25 from each of the transponders 10 and 11. These range measurements are then used by the microprocessor 26 to calculate the position of the vehicle in terms of the XY coordinate system. As mentioned previously, these calculations are standard well-known equations which can be implemented in general purpose computers by means of a wide variety of programs. Once the position of the two points E1 and E2 is entered into the memory 27 the switch 35 is moved to the final position, designated OPR, for continued operation.

With the switch 35 in the operate position the operator or pilot continues to fly the pattern 16 with the course meter 40 indicating any deviation from the particular path he is flying and the distance indicator 42 indicating how far along the path he is from the x axis. If the pilot wants to temporarily discontinue the operation, because he is out of spray or low on fuel, at any point, e.g. point S1 on path 20, he depresses a "set" button 45 on the front panel of the steering indicator 31.

The "set" button 45 is connected to the microprocessor 26 and memory 27 so as to reset, or offset, the XY coordinate system so that the X axis intersects the point S1. Thus, the distance indicator 42 will indicate zero at the point S1. The pilot then flys to his refueling rendezvous, refuels and returns to the area of point S1. When the pilot approaches the path 20 the course meter 40 guides him to the correct path, or indicates any deviation from the path 20. As the pilot flies along the path 20 the distance indicator 42 provides him with a continuous indication of how far he is from the point S1. When the distance indicator 42 approaches zero the pilot can prepare to reinitiate the operation and at the correct distance indication he can begin to spray precisely where the operation had been temporarily discontinued. Thus, substantially no overlap or discontinuities will be produced.

At some later point, such as S2 on path 20, the pilot can again temporarily discontinue the operation by depressing the "set" button 45. This will again reset the coordinate system so that the X axis intersects the point S2. This can be done as many times as it is necessary to complete the operation. It should be understood that the coordinate system is reset in this embodiment so that the origin coincides with the point of temporary discontinuance of the operation, however, it might be reset so that any convenient point in the coordinate system coincides with the last point, if desired. For example, the coordinate system might be reset so that the nearest round number distance (e.g., 100 meters, 1000 meters, etc.) coincides with the last point. Then the pilot simply has to remember what distance along the path he must fly back to, to reinitiate the operation. Thus, an improved method of returning to a last point in a path after temporary discontinuance of an operation is disclosed which greatly simplifies the procedure and reduces or eliminates overlap and discontinuities to greatly reduce cost. Further, because the return procedure is simplified the pilot can save fuel and time, which further reduces cost. While we have shown and described specific apparatus and a specific method of utilizing this apparatus, further modifications and improvements will occur to those skilled in the art. We desire it to be understood, therefore, that this invention is not limited to the particular method described and we intend in the appended claims to cover all modifications which do not depart from the spirit and scope of this invention.

What is claimed is:

1. In conjunction with an operation of directing a vehicle along a plurality of parallel paths in a predetermined pattern utilizing electronic positioning apparatus, including means for periodically measuring the distance of the apparatus from each of two spaced apart reference stations and periodically calculating the position of the vehicle relative to the two spaced apart reference stations, a method of returning to a last point in a path of the pattern after temporary discontinuance of the operation, comprising the steps of:
    (a) defining a coordinate system in conjunction with the predetermined pattern with the paths of the pattern extending generally parallel to a first axis thereof and the second axis lying perpendicular to the paths;
    (b) providing continuous indications of deviations of the vehicle from a path parallel to the first axis and continuous indications of distance of the vehicle along the path relative to the second axis using the calculated positions translated into the coordinate system;
    (c) temporarily discontinuing the operation of directing the vehicle at a point along the path and leaving the path;
    (d) redefining the coordinate system so that a predetermined point therein coincides with the point of discontinuance of the operation;
    (e) returning to the approximate area of discontinued operation and using the deviation indications to direct the movement along the path;
    (f) providing continuous indications of distance of the vehicle along the path relative to the redefined coordinate system; and
    (g) reinitiating the operation as the distance indications coincide with the predetermined point of the redefined coordinate system.

2. A method as claimed in claim 1 wherein the coordinate system is redefined so that the second axis thereof coincides with the point of discontinuance of the operation and the distance indication at that point is zero.

* * * * *